J. P. COLEMAN.
RAILWAY TRAFFIC CONTROL APPARATUS.
APPLICATION FILED MAY 18, 1915.

1,238,889.

Patented Sept. 4, 1917.
7 SHEETS—SHEET 1.

FIG. 1

WITNESSES

INVENTOR

J. P. COLEMAN.
RAILWAY TRAFFIC CONTROL APPARATUS.
APPLICATION FILED MAY 18, 1915.

1,238,889.

Patented Sept. 4, 1917.
7 SHEETS—SHEET 6.

WITNESSES

INVENTOR

J. P. COLEMAN.
RAILWAY TRAFFIC CONTROL APPARATUS.
APPLICATION FILED MAY 18, 1915.

1,238,889.

Patented Sept. 4, 1917.
7 SHEETS—SHEET 7.

FIG. 14

WITNESSES

INVENTOR

UNITED STATES PATENT OFFICE.

JOHN P. COLEMAN, OF EDGEWOOD BOROUGH, PENNSYLVANIA, ASSIGNOR TO THE UNION SWITCH & SIGNAL COMPANY, OF SWISSVALE, PENNSYLVANIA, A CORPORATION OF PENNSYLVANIA.

RAILWAY-TRAFFIC-CONTROL APPARATUS.

1,238,889.  Specification of Letters Patent.  Patented Sept. 4, 1917.

Application filed May 18, 1915. Serial No. 28,840.

*To all whom it may concern:*

Be it known that I, JOHN P. COLEMAN, a citizen of the United States, residing at Edgewood borough, in the county of Allegheny and State of Pennsylvania, have invented certain new and useful Improvements in Railway-Traffic-Control Apparatus, of which the following is a specification.

My invention relates to railway traffic control apparatus, and more particularly to apparatus for causing reverse movements of railway switches and the like.

I will describe certain forms of apparatus embodying my invention and then point out the novel features thereof in claims.

In the accompanying drawings.

Similar reference characters refer to similar parts in each of the several views.

Figure 1:
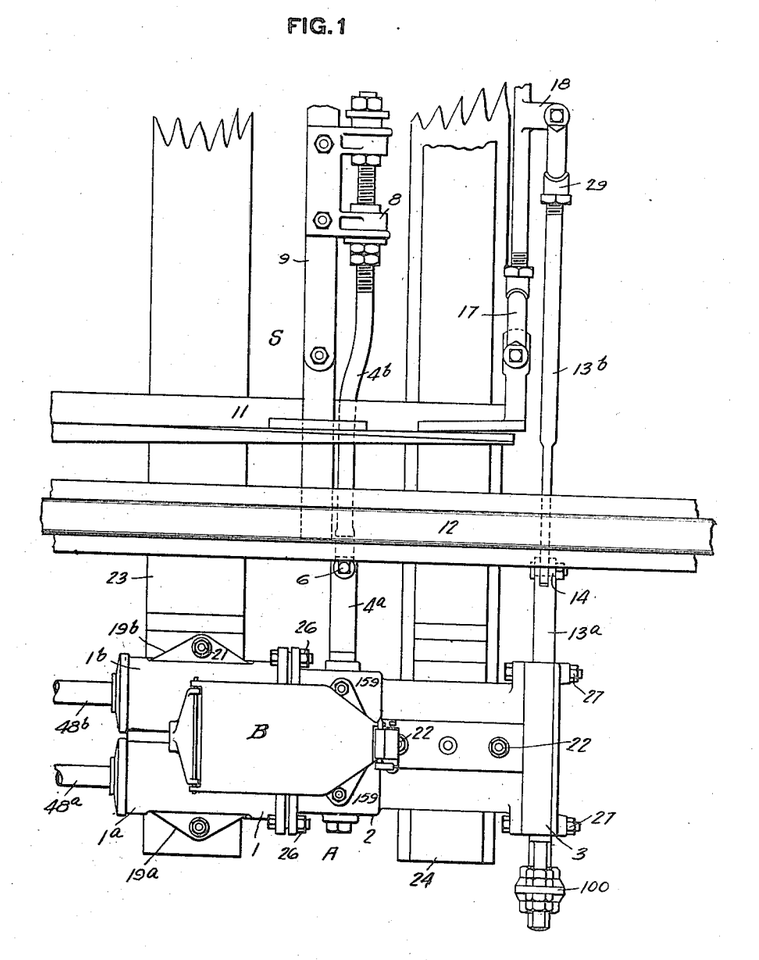
Figure 1 is a plan view showing one form of apparatus embodying my invention applied to a railway switch.

Referring first to Fig. 1, I have here shown one form of mechanism A embodying my invention applied to a railway switch S. Reference character B designates a circuit controller for controlling the indication circuits for the switch, as I shall describe hereinafter. I have shown only part of switch S; namely, one of the main rails 12 and one of the switch points 11. Reference characters 9 and 17 designate respectively the head rod and the front rod of the switch. I provide a switch operating rod $4^a$—$4^b$ for moving the switch. Part $4^a$ of this rod is adapted to be reciprocated by mechanism A and part $4^b$ is connected to part $4^a$ by a bolt 6 and is attached by means of an adjustable bracket 8 to head rod 9. As one member of the locking mechanism I provide a lock rod $13^a$—$13^b$, part $13^a$ of which is adapted to reciprocate and may be locked by mechanism A in either of its extreme positions, as I shall describe hereinafter, and part $13^b$ of which is connected at one end to part $13^a$ by means of a bolt 14 and is attached at the other end to front rod 17 by means of a turnbuckle 29 and a bracket 18.

Figure 2:
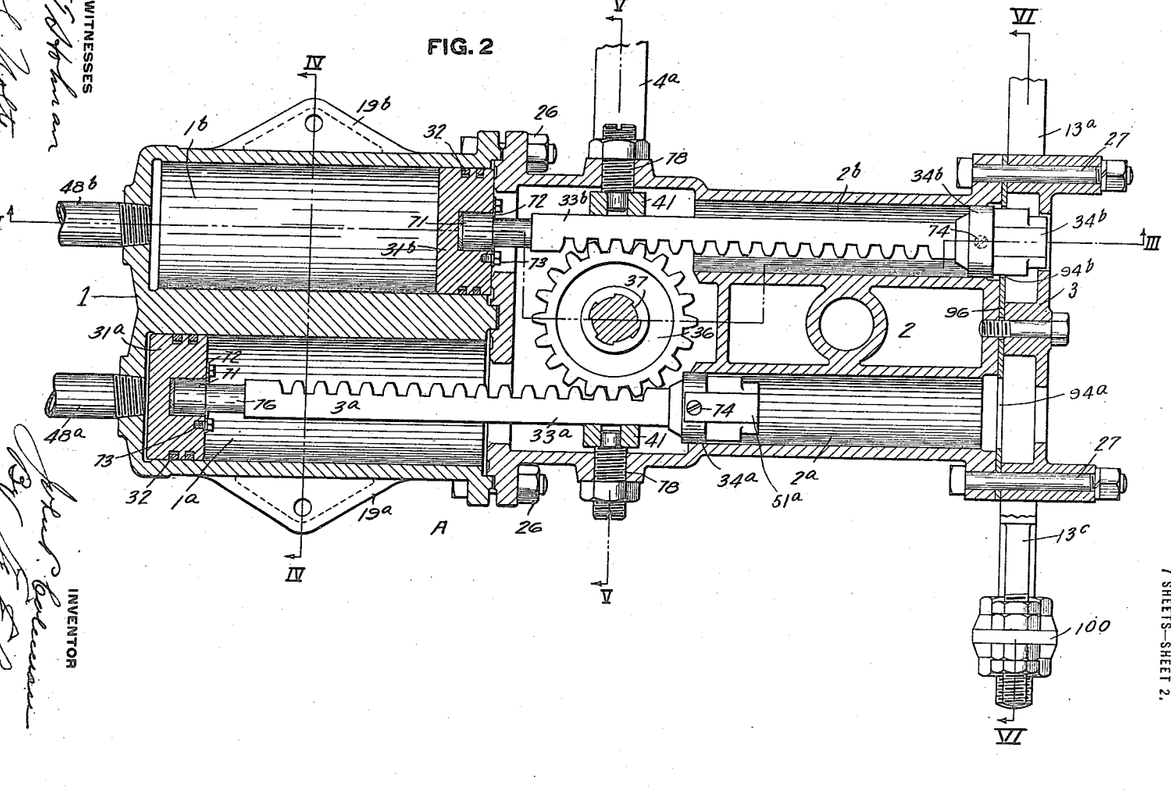
Fig. 2 is a horizontal sectional view of the apparatus shown in Fig. 1.

Referring now to Figs. 1 to 6, the mechanism A consists of castings 1, 2 and 3 held together by bolts 26 and 27. One end of mechanism A is secured to tie 23 by means of bolts 21, which are passed through tie 23 and flanges $19^a$ and $19^b$ of casting 1. The other end of mechanism A is fastened to tie 24 by means of a U bolt 22. A plate 29 rigidly secured to tie 24 is provided with a hole into which a "boss" 28 on the underside of casting 2 is inserted so that when U bolt 22 is tightened this end of the mechanism is firmly anchored in place and all shearing stresses are removed from the bolt. Casting 1 comprises two cylinders $1^a$ and $1^b$ provided with pistons $31^a$ and $31^b$ respectively, which pistons are as usual provided with piston rings 32. Casting 2 comprises two cylindrical parts $2^a$ and $2^b$, which are coaxial with cylinders $1^a$ and $1^b$ respectively and form guides for plungers $34^a$ and $34^b$ respectively. Pistons $31^a$ and $31^b$ are connected with plungers $34^a$ and $34^b$ respectively by means of racks $33^a$ and $33^b$. The left ends of these racks which are shaped into round heads 71 are inserted into pistons $31^a$ and $31^b$ respectively. They are secured in the pistons by means of plates 72 (see Figs. 2 and 4) each of which plates is slotted so as to pass over the neck portion 76 of the corresponding rack and is fastened to the corresponding piston by means of screws 73. The right ends of racks $33^a$ and $33^b$ are shaped into threaded bolts which are screwed into plungers $34^a$ and $34^b$ respectively (see Figs. 2 and 3) and are locked therein by means of screws 74. The toothed surfaces of the racks engage a pinion 36 which is mounted on a crank shaft 37 and is secured thereto by any suitable means, such as corresponding longitudinal slots and projections on the crank shaft and the bore through the pinion wheel (as best shown in Fig. 2). In order to prevent rotation of the racks on the axis of the cylinder and to maintain the proper relation of the pitch lines of the racks and pinion I provide lateral guides which are, as here shown, rollers 41 mounted on trunnions 78 screwed into casting 2. The racks are so meshed with pinion 36, that, when piston $31^a$ is at one end of its stroke, piston $31^b$ is at the other end of its stroke. If the parts of the mechanism are in the positions shown in Fig. 2, and compressed air is admitted to cylinder $1^a$ from a pipe $48^a$, rack $33^a$ is moved to the right thereby revolving pinion 36 counter-clockwise so that rack $33^b$ travels from right to left. Similarly when the parts of the mechanism are in the last mentioned positions they can be reversed by admitting air to cylinder $1^b$ from a pipe $48^b$. Thus it is apparent that the pinion and crank shaft can be given either a clockwise or a counter clockwise motion by admitting compressed air to cylinder $1^b$ or $1^a$. By properly proportioning the length of piston stroke to the pinion diameter, I make the angle through which pinion 36 is rotated preferably greater than 180°, say, 220°, for reasons which will appear hereinafter.

Figures 3, 4, 5:
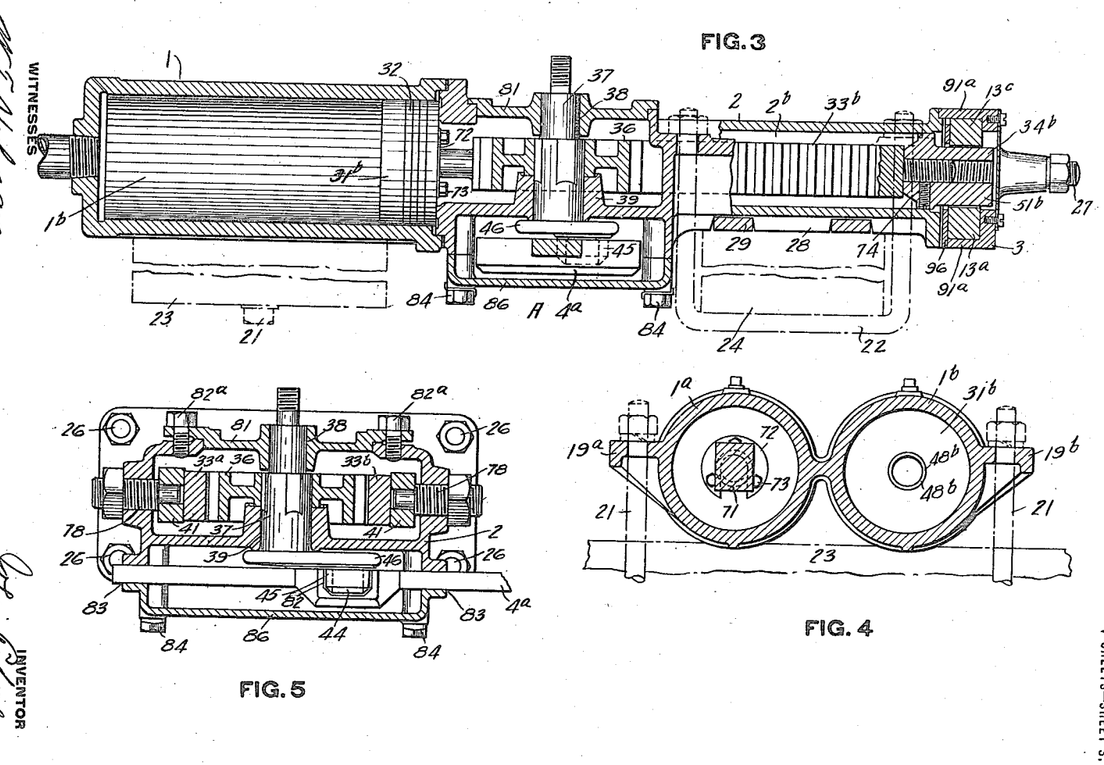
Figs. 3, 4, 5, 6 are views showing vertical sections through Fig. 2 on lines III—III, IV—IV, V—V, VI—VI respectively, looking in the directions of the arrows.
Figure 7:
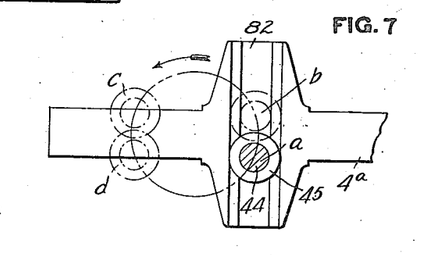
Fig. 7 is a plan view of part of the apparatus shown in Figs. 3 and 5.

The rotation of the crank shaft 37 I utilize to operate the switch S, as I shall now describe. As best shown in Fig. 5, crank shaft 37 rotates in a lower bearing 39, which is machined in casting 2, and in an upper bearing 38 which is cut in a plate 81 secured to casting 2 by means of screws $82^a$. The lower end of crank shaft 37 terminates in a crank arm 46. A crank pin 44 extending from the under side of arm 46 is provided with a roller 45 which is adapted to move in a transverse slot 82 in rod $4^a$. This is best shown in Fig. 7, which is a plan view of rod $4^a$ with pin 44 in slot 82 in the position which corresponds to the position of the pistons shown in Fig. 2. Rod $4^a$ may be reciprocated in bearings 83 (Fig. 5) formed by clamping a bottom plate 86 against casting 2 by means of screws 84. It is evident that rotation of crank 45 imparts harmonic motion to rod $4^a$. Furthermore, it is apparent that a rotation of crank 45 in the direction of the arrow in Fig. 7 through an angle of, say, 220°, beginning with the position shown in Fig. 7, results in the following motion of bar $4^a$. During the first 40° of its movement crank pin 44 travels from position $a$ to position $b$. The motion imparted thereby to rod $4^a$ is negligibly small because the crank arm is then passing over "dead center" with respect to slot 82 or rod $4^a$. During the following 140° of its stroke, i. e. when moving from position $b$ to $c$, the rod $4^a$ is shifted from right to left in harmonic motion. Lastly, during the remaining 40° of its stroke crank pin 44 moves from position $c$ to position $d$, but rod $4^a$ remains practically unmoved. In other words, when the racks are moved through one stroke, i. e. from one extreme position to the other, the switch points remain substantially unmoved during the first part of the stroke of the racks, are shifted during the next part of the stroke and remain in substantially the latter position during the last part of the stroke. The first and last parts of the stroke of the racks I utilize for unlocking and locking the switch, as I shall now describe.

Figure 6:
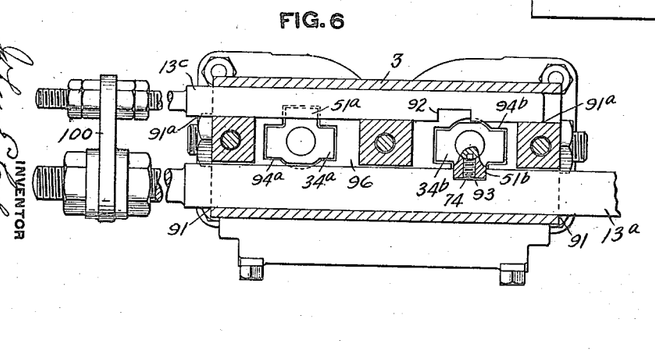

Referring now to Figs. 2, 3 and 6, the lock rod $13^a$ is adapted to reciprocate in guides 91 in casting 3. Another rod $13^c$ is adapted to reciprocate in guides $91^a$ and is rigidly attached to rod $13^a$ by means of an adjustable bracket 100. Notches 92 and 93 are cut into bars $13^c$ and $13^a$ respectively. Plungers $34^a$ and $34^b$, when in their extreme right hand positions, extend respectively through holes $94^a$ and $94^b$ in a plate 96 clamped between casting 2 and casting 3, so that they intersect the path of locking bars $13^a$ and $13^c$. Plungers $34^a$ and $34^b$ are equipped with shoulders $51^a$ and $51^b$ respectively, which are adapted to pass into notches 92 and 93 respectively in the locking bars and prevent longitudinal movement of these bars when the shoulder of either one of the plungers is in the corresponding notch in the locking bars. From Figs. 2 and 6, it is plain that when rack $33^a$ is moving toward the right it cannot complete its stroke unless the locking bars have previously been moved into such position that shoulder $51^a$ can pass into notch 92 in locking bar $13^c$. Similarly, when mechanism A is operated in the reverse direction, i. e., when rack $33^b$ is moved toward the right, the mechanism cannot complete its operation unless the locking bars have been shifted so that shoulder $51^b$ passes into notch 93 of bar $13^a$. The length of rod $13^b$ (see Fig. 1) is adjusted by turnbuckle 29 so that with the switch in the position shown, notch 93 is engaged by shoulder $51^b$, thus locking switch S firmly in place. The position of notch 92 is adjusted by bracket 100 so that when the switch is reversed, the locking bars are shifted so that notch 92 is engaged by shoulder $51^a$ and the switch is again locked in position.

During a complete stroke of the racks the mechanism A operates as follows: When the mechanism is in the position shown in the drawing and air under pressure is admitted to cylinder $1^a$, rack $33^a$ is pushed to the right and rack $33^b$ is drawn to the left, so that shoulder $51^b$ is drawn out of notch 93, thus unlocking the switch. This occurs during the movement of crank pin 44 from position $a$ to position $b$ in Fig. 7. The switch is shifted when crank pin 44 travels from position $b$ to position $c$, so that in that period the lock rods are moved to their extreme left position, and notch 92 is brought opposite hole $94^a$ in plate 91. During the remainder of the stroke, i. e., when crank pin 44 moves from position $c$ to position $d$, shoulder $51^a$ is pushed into notch 92, so that the switch is locked securely in its new position. An operation of the switch in the reverse direction is similar and needs not be explained here.

If switch rod $4^a$ breaks or is otherwise disconnected from switch S, the latter is not moved through its complete stroke when mechanism A is operated. As a result the lock rods are also not moved from one extreme position to the other, and mechanism A cannot complete its operation because the shoulder of one of the locking plungers encounters lock rod $13^a$ or $13^c$ as the case may be. In a similar manner it follows that mechanism A cannot complete its operation if the lock rod or both the switch rod and the lock rod are disconnected from the switch.

Figure 8:
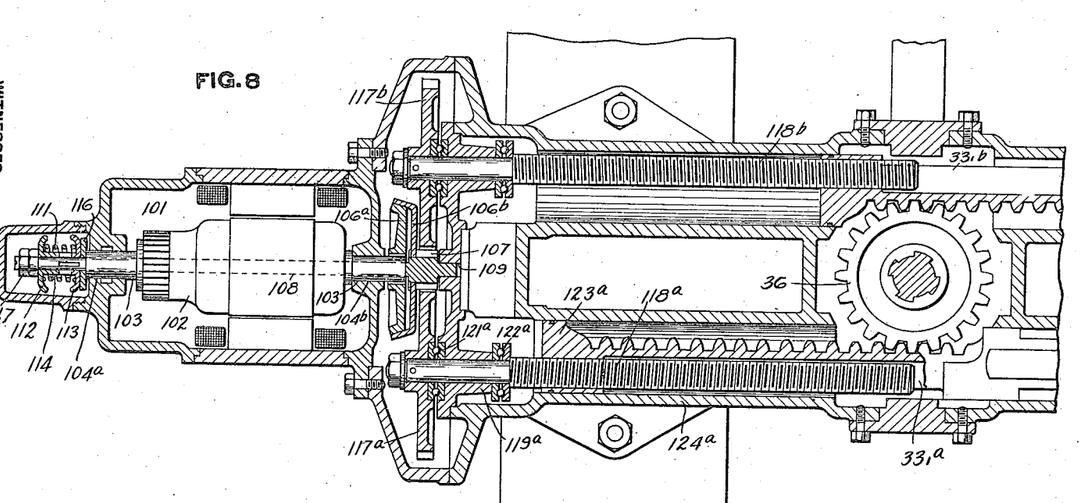
Fig. 8 is a horizontal sectional view showing another form of apparatus embodying my invention.

In Fig. 8 I have shown a modification of the apparatus described hereinbefore in which modification the racks are driven by mechanism operated by an electric motor 101, as I shall now describe. The armature 102 of motor 101 is attached to a shaft 103 which rotates in bearings $104^a$ and $104^b$. Keyed to shaft 103 is one member $106^a$ of a cone clutch. Motor shaft 103 is hollow so that a shaft 108, to which is attached a pinion 107, can be inserted therein so as to be free to turn. The right extremity of shaft 108 is guided in a bearing 109. The other member $106^b$ of the cone clutch is keyed to pinion 107. For adjusting the pressure between the two clutch members $106^a$ and $106^b$, I provide a spring 111, which is mounted between two annular stops 112 and 113 on the left end of shaft 108. Stop 112 is provided with a sleeve 114 so that it can slide on shaft 108. Stop 113 is keyed to shaft 108 in such manner that it may be reciprocated thereon, but cannot be turned with respect to the shaft. A washer 116 is interposed between stop 113 and the left extremity of shaft 103. Nuts 117 are provided on shaft 108 for compressing spring 111. From this construction it follows that spring 111, when compressed, forces shaft 108 to the left and shaft 103 to the right. Thus the clutch members $106^a$ and $106^b$ are forced together with a pressure depending upon the adjustment of the spring pressure. The torque of the motor is thus transmitted from shaft 103 through clutch 106 to pinion 107. Although shaft 108 is used to control the value of the torque which can be transmitted by the clutch, yet this shaft is not strained by the transmission of that torque. Pinion 107 rotates two gears $117^a$ and $117^b$ in the same direction. Gear $117^a$ is keyed to a screw $118^a$, the shaft of which revolves in a journal $119^a$ and thrust bearings $121^a$ and $122^a$. The right end of screw $118^a$ is adapted to revolve in a threaded hole through the head $123^a$ of a rack $331^a$, which head is adapted to move in a cylindrical guide $124^a$. Rack $331^a$ which meshes with pinion 36—and is therefore prevented from turning about its axis—can thus be moved in either direction by rotation of screw $118^a$. In a similar manner gear $117^b$ rotates a screw $118^b$, and moves thereby rack $331^b$. Since gear wheels $117^a$ and $117^b$ rotate in the same direction and it is necessary that racks $331^a$ and $331^b$ move simultaneously in opposite directions, one screw $118^a$ is provided with a left hand thread and the other screw $118^b$ is provided with a right hand thread. The remaining parts of this mechanism, being similar to the corresponding parts of the mechanism shown in Figs. 1 to 7 and described hereinbefore, need not be described further.

It will be clear that rotation of the motor 101 in one direction will cause rotation of pinion 36 in one direction, and that rotation of the motor 101 in the other direction will cause reverse movement of pinion 36. The operation of the structure shown in Fig. 8 is therefore the same as that of the structure shown in Fig. 2.

From the above description of the two forms of mechanism embodying my invention it is apparent that a complete rotation of crank shaft 37 through 220° is an absolutely reliable indication that the switch has been moved from one position to the other and locked securely in its new position. For that reason the rotation of the crank shaft may be utilized for operating a circuit controller to control the so-called indication circuits of the switch. One form of circuit controller embodying my invention I shall describe below.

Figure 9:
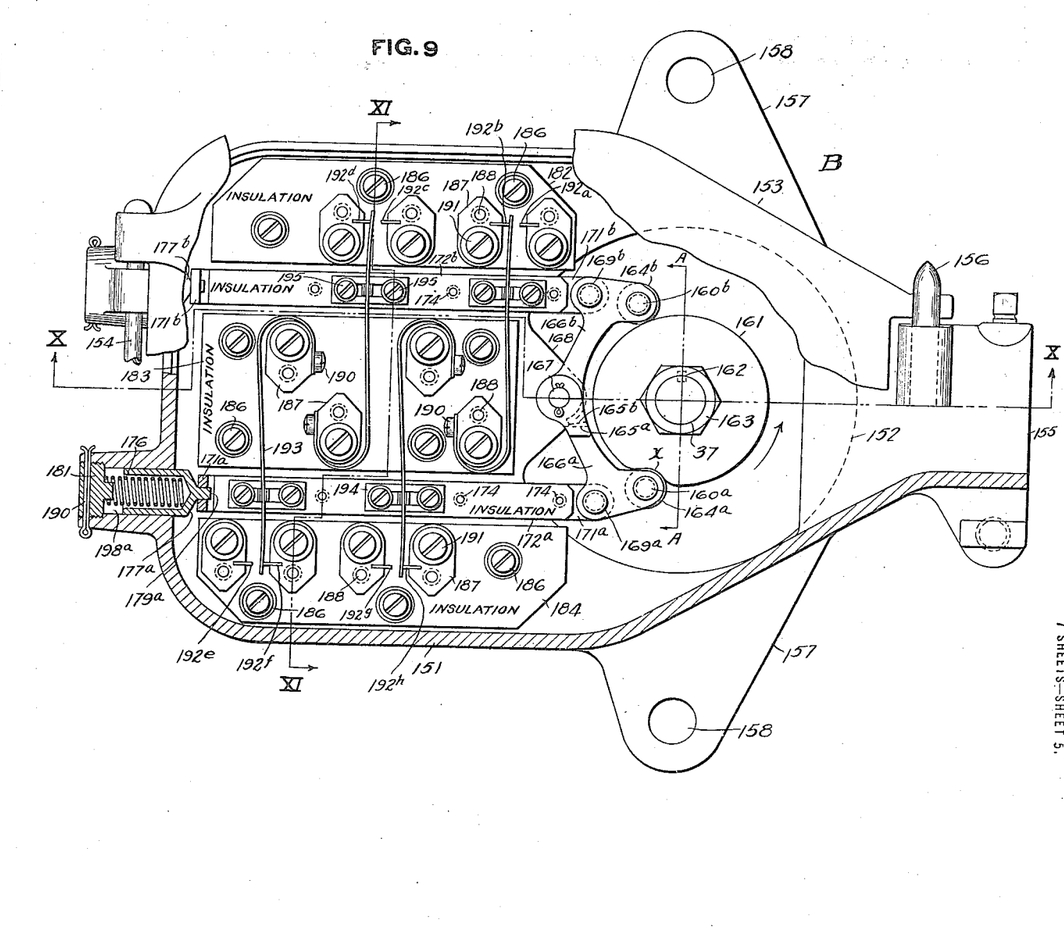
Fig. 9 is a plan view, partly sectioned of the indication circuit controller B shown in Fig. 1.
Figure 10:
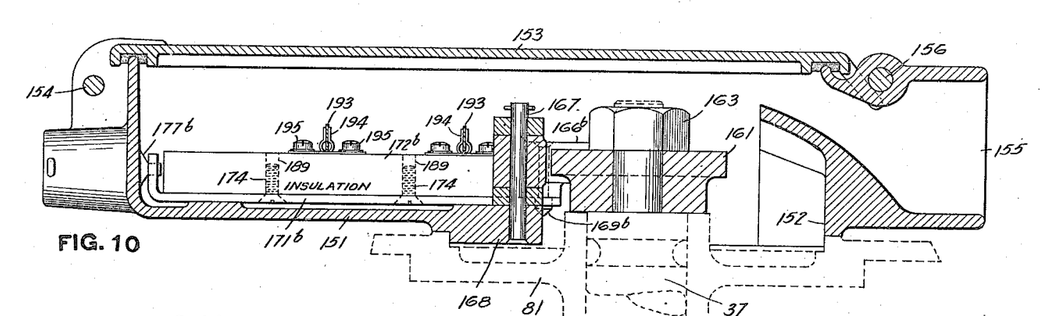
Figs. 10 and 11 are vertical sectional views of Fig. 9 on lines X—X and XI—XI respectively, looking in the directions of the arrows.
Figure 11:
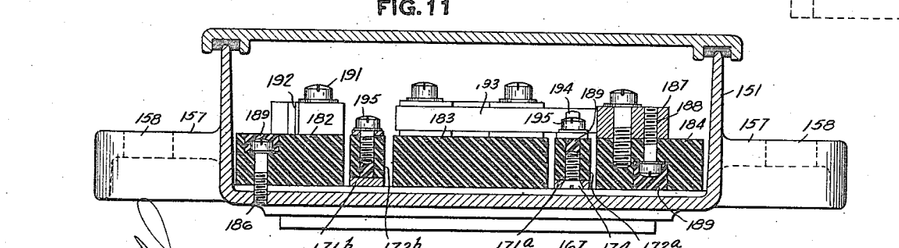
Figure 12:
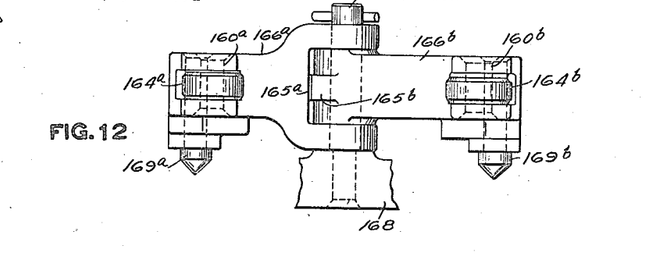
Fig. 12 is a view showing part of the apparatus shown in Fig. 9.

Referring to Figs. 9, 10, 11 and 12, reference characters 37 and 81 designate respectively the crank shaft and the plate comprising the upper bearing therefor, which form part of the mechanism A described hereinbefore. The circuit controller B comprises a box 151 having in the bottom an opening 152 through which the upper end of crank shaft 37 can be inserted, as best shown in Fig. 10. A cover 153, shown partly broken away in Fig. 9 is hinged to box 151 by means of a pin 154, and can be locked by means of a hasp 156. Flanges 157, cast integral with box 151 are provided with holes 158, so that the box may be attached to mechanism A by bolts 159, as shown in Fig. 1. Wires may be led into the box through the open end 155.

The circuit controller is operated by a cam 161 locked to crank shaft 37 by means of a key 162, and held in place by means of a nut 163. Rollers 164$^a$ and 164$^b$ for engaging cam 161 are mounted on pins 160$^a$ and 160$^b$ fixed in operating cranks 166$^a$ and 166$^b$ respectively, which cranks are pivotally mounted on a stud 167 inserted in a lug 168 formed in the bottom of box 151. An elevation of the operating cranks is shown to a larger scale in Fig. 12, which shows the cranks when viewed from line A—A of Fig. 9. Mounted to reciprocate in the box 151 are two slide bars 171$^a$ and 171$^b$, which bars are connected with the cranks 166$^a$ and 166$^b$ respectively by pins 169$^a$ and 169$^b$. The slide bars carry bars of insulating material 172$^a$ and 172$^b$, which latter bars are attached to the slide bars by screws 174. These slide bars operate contacts as hereinafter described. Slide bar 171$^a$, the left extremity of which is bent vertically upward, is biased to the right by means of a spring 176 which acts upon a piston 177$^a$ in a cylinder 198$^a$. The right end of piston 171$^a$ is shaped into a stud 179$^a$ which is inserted into a horizontal hole in the vertical end of bar 171$^a$. To provide a stop for spring 176, a plug 181 is screwed into the end of cylinder 198$^a$ and locked therein by means of a pin 190. By means of a similar spring acting on a piston 177$^b$, also slide bar 171$^b$ is biased to the right. Consequently, operating cranks 166$^b$ and 166$^a$ are biased to move in a clockwise and a counter-clockwise direction, respectively about pivot 167, so that both rollers 164$^a$ and 164$^b$ are held in contact with cam 161 and are forced to follow the cam surface.

As here shown the cam surface is circular except for an indentation X. When this indentation is brought opposite one of the cam rollers, for instance roller 164$^a$, as shown on the drawing, the corresponding slide bar 171$^a$ is moved to the right by spring pressure. As soon as the cam is rotated further, however, the slide bar is returned to its former left position, being driven there against the spring pressure by means of force exerted by the cam. This movement of the slide bars I utilize for the operation of contacts, as I shall now describe.

Figure 13:
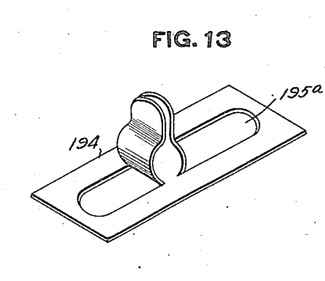
Fig. 13 is a perspective view of another part of the apparatus shown in Fig. 9.

Reference characters 182, 183 and 184 designate terminal boards of insulating material mounted on the bottom of box 151 by means of countersunk screws 186. Metallic blocks 187 are fastened to the terminal boards by means of countersunk screws 188. All screws holes are, for the purpose of precaution against grounds, stopped up with insulating material 189. Blocks 187 are provided with screws 191 for attaching wires thereto. The blocks 187 which are located on the middle board 183 carry contact fingers 193 which engage with tips 192$^a$ to 192$^h$ soldered to the blocks 187 located on the two outside boards 182 and 184. Near the ends, fingers 193 are guided by clamps 194 on the slide bars 172$^a$ and 172$^b$. One of these clamps is shown in perspective in Fig. 13. The clamps are mounted on bars 172$^a$ and 172$^b$ by means of screws 195 which are passed through longitudinal slots 195$^a$ in the base of the clamps, whereby the position of the clamps may be so adjusted, that, when the roller of the corresponding slide bar rides on the circular part of the cam surface, the contact fingers engage the corresponding contact tips to the left of the fingers. When a roller is brought into the indentation X, however, the resulting motion of the slide bar causes the contact fingers to engage the contact tips at the right. It follows that the contact fingers 193 normally make contact with the contact tips to the left due to positive force exerted against the spring action by means of cam 161, and that they engage the right hand contact tips only when the indentation X on the cam surface is brought opposite the corresponding roller.

In order to prevent too great an angular motion of the operating cranks, due to the action of the biasing springs, when cam 161 is removed from crank shaft 37 for purposes of inspection or maintenance, I provide lock jaws 165$^a$ and 165$^b$ for cranks 166$^a$ and 166$^b$ respectively. These jaws engage, thus preventing collapse of the operating cranks, after they have moved toward each other through a predetermined angle.

Circuit controller B may be used with any suitable system of indication circuits. For purposes of illustration I shall describe the use of the above described circuit controller with indication circuits similar to those described in U. S. Letters Patent No. 1,127,593 granted to me the 9th day of February, 1915.

Figure 14:
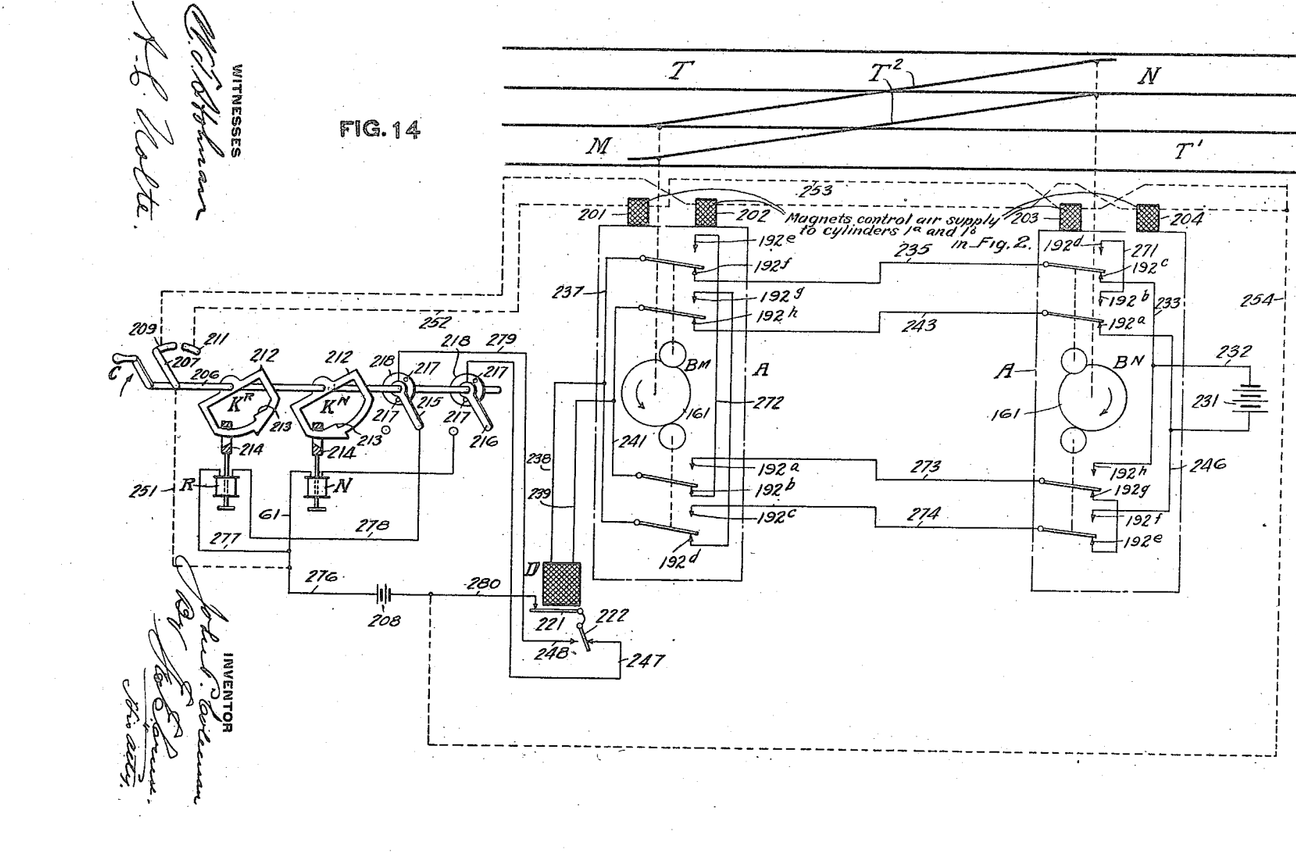
Fig. 14 is a diagrammatic view showing one arrangement of circuits which may be used in connection with the apparatus shown in the preceding views.

Referring to Fig. 14 T and T' are two parallel railway tracks, which tracks are connected by a crossover comprising track rails T$^2$ and two switches M and N. When these switches are set in the positions shown in the drawing, which I will term the "normal" positions, traffic will not be diverted from track to track, but when the switches are moved to their "reverse" positions, traffic is diverted from track T to T' or vice versa. Each switch is provided with a switch actuating mechanism A preferably similar to the one described hereinbefore. In this drawing I have indicated these mechanisms diagrammatically by dot-and-dash lines. Mechanisms A operate circuit controllers B$^M$ and B$^N$, shown diagrammatically, and each of which is similar to circuit controller B described hereinbefore. As here shown mechanisms A are controlled by electromagnets 201, 202, 203 and 204. This control may be effected in any convenient manner. For example, these electromagnets may be used to control the supply of air pressure to cylinders 1$^a$ and 1$^b$ of mechanisms A by operating valves located in pipes 48$^a$ and 48$^b$, as is well understood by those versed in the art. I have not shown any means for accomplishing this; suffice it to say that, when magnets 201 and 203 are energized, mechanisms A operate switches M and N to the normal positions, when magnets 202 and 204 are energized mechanisms A operate switches M and N to the reversed positions.

Magnets 201, 202, 203 and 204 are controlled by means of a circuit controlling lever C, which is usually one of a plurality of simliar levers comprised in an "interlocking machine." This lever C may be of any suitable type; as here shown, it comprises a shaft 206 which is adapted to oscillate and which operates a contact finger 207 for the control of the circuits for the electromagnets. The control circuits for these electromagnets are herein shown in dash lines for the purpose of distinction, the circuits for the indication apparatus being shown in solid lines. 208 designates a source of current, which, as here shown, is a battery.

In the arrangement of the control circuits herein shown, electromagnets 201 and 203 or 202 and 204 of each switch operating mechanism are connected in series with the source of current 208 according as contact finger 207 engages with contact 209 or 211. The movements of the shaft 206 are as usual controlled by indication apparatus, which, as here shown, comprises two indication devices $K^N$ and $K^R$, one for each direction of movement. Each of these indication devices comprises a segment 212 fixed to the shaft 206 and provided with a dog 213 adapted to engage with a latch 214, which latches are controlled respectively by electromagnets N and R. Each of the electromagnets N and R is provided with a circuit which is controlled by a relay D as hereinafter explained. The circuits for these indication magnets are also controlled by contacts 215 and 216 operated by shaft 206. These contacts are not moved during the first portion of the movement of the shaft 206 up to the point at which it is stopped by the dog 213 of one or the other of the indication devices, but during the remainder of the movement of the shaft, the contacts 215 and 216 are reversed in position. This operation of contacts 215 and 216 is, as here shown, accomplished by mounting the contact fingers loosely on the shaft 206, and moving them by pins 217 carried by collars 218 fixed on the shaft 206.

Relay D comprises two contacts. One of these contacts 221 which I will term the neutral contact, is responsive to the presence or absence of current in the relay, while the other contact 222, which I will term the polarized contact, is responsive only to reversals of current in the relay.

The relay D is provided with a circuit which is controlled by the two circuit controllers $B^M$ and $B^N$. These circuit controllers and the connections thereto are so arranged that when both switches are in normal position, relay D is energized from a battery 231 in one direction so that the polarized contact 222 occupies one extreme position, and that when both switches are in the reverse position, relay D is energized in the opposite direction so that the polarized contact 222 occupies its other extreme position. Under all other circumstances, that is, when the switches are not both in the normal or both in the reverse positions, the relay D is disconnected from battery 231 and is placed on short circuit so that the neutral contact 221 of relay D will be open, thereby preventing the energization of either indication magnet N or R.

With the parts in the positions shown in Fig. 14, that is, when the switches are in their normal positions, relay D is energized by the following circuit: from battery 231, through wires 232 and 233, contact $192^c$ of controller $B^N$, wire 235, contact $192^f$ of controller $B^M$, wires 237 and 238, relay D, wires 239 and 241, contact $192^h$ of controller $B^M$, wire 243, contact $192^a$ of controller $B^N$, wire 246 to battery 231. The relay D is then energized in such direction that contact 222—247 is closed and contact 222—248 is open, so that normal indication magnet N was energized before its circuit was opened at contact 216.

When it is desired to move the switches M and N from their normal positions to their reverse positions, the shaft 206 of control lever C is rotated in the direction indicated by the arrow until the dog 213 of indication device $K^R$ engages the latch 214. In this position the contact finger 207 has been disengaged from contact 209 and has engaged contact 211 so that electromagnets 201 and 203 are energized through the following circuit: from battery 208, through wire 251, contact 207—211, wire 252, magnet 201, wire 253, magnet 203, wire 254, to battery 208. Mechanisms A are caused thereby to operate switches M and N to rotate cams 161 of circuit controllers $B^M$ and $B^N$ simultaneously in the direction of the arrows. At the beginning of the movement of the cams, circuit controller $B^M$ opens contacts $192^h$ and $192^f$ and closes contacts $192^g$ and $192^e$; circuit controller $B^N$ opens contacts $192^a$ and $192^c$ and closes contacts $192^b$ and $192^d$. Battery 231 is thus disconnected from wires 243 and 235, which are thereupon short circuited at circuit controller $B^N$ by means of a wire 271. Relay D is disconnected from wires 235 and 243 and is then short circuited at circuit controller $B^M$ by the connection: from relay D through wires 239, 241, contact $192^b$, wire 272, contact $192^e$, wires 237 and 238 to relay D. The neutral contact 221 of relay D is then open, so that neither indication magnet N or R can be energized. The purpose of placing relay D on short circuit is to prevent false operation of this relay by any current which might leak into wires 238 and 239. When the movement of the switches has been completed, circuit controller B^M opens contacts 192^b and 192^d and closes contacts 192^a and 192^c. Thereby the short circuit is removed from relay D and wires 273 and 274 are connected to the relay leads 239 and 238 respectively. At the same time circuit controller B^N opens contacts 192^g and 192^e and closes contacts 192^h and 192^f, thereby connecting battery 231 to wires 273 and 274. Thus relay D is energized by current flowing in the circuit: from battery 231, through wires 232 and 233, contact 192^h of controller B^N, wire 273, contact 192^a of controller B^M, wires 241 and 239, relay D, wires 238 and 237, contact 192^c of controller B^M, wire 274, contact 192^f of controller B^N, wire 246 to battery 231. The direction of flow of current through the relay winding is now opposite to the direction of flow of current when the switches M and N were in the normal position. Relay D is therefore energized so that contact 222—248 is closed, and the reverse indication magnet R is energized by the following circuit: from battery 208, through wires 276 and 277, magnet R, wire 278, contact 215, wire 279, contact 248—222, contact 221, wire 280 to battery 208. Magnet R then raises its armature, thereby raising the latch 214 out of the path of dog 213 of indication device K^R so that the movement of shaft 206 can be continued to the end of the stroke. During this last portion of the movement, contact 215 is opened thereby opening at this point the circuit for magnet R, and contact 216 is closed thereby closing at that point the circuit for magnet N.

The operation of the apparatus for the movement of the switches M and N from the "reverse" to their "normal" position would be similar to that just explained, hence it need not be described here in detail.

Although I have herein shown and described only certain forms of apparatus embodying my invention, it is understood that various changes and modifications may be made therein within the scope of the appended claims.

Having thus described my invention, what I claim is:

1. In combination, a railroad traffic controlling device, means for moving said device from one position to another, said means including a pinion and two racks meshing with said pinion, a lock rod moving with said device, said racks being adapted to lock said lock rod in one position or the other when said means and device occupy corresponding positions.

2. In combination, a railroad traffic controlling device capable of assuming two positions, means for moving said device, said means including two racks and a pinion, and a lock rod connected to said device and adapted to be locked in one position or the other by said racks only when said means and said device occupy corresponding positions.

3. In combination, a railway switch, means for locking said switch in one position or the other, said means including a lock rod connected to the switch points, two plungers, one to lock said lock rod in one position, the other to lock said lock rod in the other position, means for moving said plungers simultaneously in opposite direction, said means including a pinion and racks, and means controlled by said pinion for throwing said switch.

4. In combination, a railway switch capable of assuming two positions, a pinion capable of rotation through an angle greater than 180°, means operated during a continuous rotation of said pinion through an angle greater than 180° for progressively unlocking said switch in one position, throwing said switch to its other position, and locking said switch in said other position, said means preventing said pinion from completing its angular motion unless the switch has completely moved to its other position.

5. In combination, a railway traffic controlling device, a pinion mounted to rotate, means intermediate the pinion and the said device whereby reverse operations of said device are caused by rotation of said pinion in opposite directions, two racks meshing with said pinion, means for reciprocating said racks, and a lock rod attached to said device and coacting with said racks to prevent completion of the movement of the pinion until the device has finished its movement in response to the initial movement of the pinion.

6. In combination, a pinion, two racks for engaging said pinion, a motor, mechanism intermediate said motor and said racks for driving said racks simultaneously in opposite directions, a railway switch operated by said pinion, and locking means for said switch controlled by said racks.

7. In combination, a railway switch, an operating rod therefor, a pinion for actuating said rod, racks engaging said pinion, a screw for propelling each rack, an electric motor, gears intermediate said motor and said screws and a lock rod for said switch adapted to be locked by said racks.

8. In combination, a railway switch, a lock rod operatively connected therewith, a pinion, means operatively connected with said pinion for moving said switch, two racks meshing with said pinion on opposite sides of the center thereof and coacting with said lock rod to lock the switch, and means for reciprocating said racks.

9. In combination, a railway switch, locking means operatively connected therewith and comprising two members one of which is adjustable with respect to the other, mechanism for actuating said switch, and two plungers operated by said mechanism and coacting respectively with said two members of said locking means for locking the switch in extreme positions.

In testimony whereof I affix my signature.

JOHN P. COLEMAN.

Witnesses:
 M. S. KIRKLAND,
 H. MILLER.